United States Patent [19]
Davis

[11] 3,890,593
[45] June 17, 1975

[54] MULTI-DIRECTIONAL SEISMIC EXPLORATION METHODS ON NAVIGABLE WATER

[75] Inventor: JLee Davis, Ector, Tex.

[73] Assignee: Advance Oil and Gas Co., Inc., Midland, Tex.

[22] Filed: June 28, 1973

[21] Appl. No.: 374,497

Related U.S. Application Data

[63] Continuation-in-part of Ser. No. 145,811, May 21, 1971, Pat. No. 3,746,122.

[52] U.S. Cl...... 340/15.5 MC; 340/7 R; 340/15.5 R
[51] Int. Cl............................................. G01v 1/28
[58] Field of Search...... 340/7 R, 15.5 MC, 15.5 CP

[56] References Cited
UNITED STATES PATENTS

| | | | |
|---|---|---|---|
| 3,414,874 | 12/1968 | McLoad | 340/7 R |
| 3,506,955 | 4/1970 | Backus | 340/15.5 CP |
| 3,731,270 | 5/1973 | Penhollow | 340/15.5 CP |

*Primary Examiner*—Maynard R. Wilbur
*Assistant Examiner*—H. A. Birmiel
*Attorney, Agent, or Firm*—Clegg, Cantrell & Crisman

[57] ABSTRACT

A number of seismic detectors are located in a two-dimensional array on the surface of the earth, either on land or at sea. One or more seismic disturbances are produced in the vicinity of the seismic detectors at points located to produce sampling of various subsurface reflection points to form one or more two-dimensional areas of coverage. For each seismic disturbance, the subsurface reflections thereof received by the various seismic detectors are recorded. In some embodiments, the seismic disturbances are produced at points located to produce multi-directional sampling of each of various subsurface reflection points and recordings for different ones of the seismic disturbances are combined to produce stacked recordings wherein multi-directional reflections from common subsurface points are added. On navigable water the multi-directional sampling is conducted by traversing a region to be surveyed with two vessels on generally parallel courses each towing a string of hydrophones, and alternately creating seismic disturbances in the water adjacent each vessel to thereby sample a plurality a reflecting points located along a line which tracks the planned survey line well notwithstanding deviations in the courses of the vessels and hydrophones caused by water currents and navigational errors.

2 Claims, 5 Drawing Figures

3,890,593

MULTI-DIRECTIONAL SEISMIC EXPLORATION METHODS ON NAVIGABLE WATER

BACKGROUND OF THE INVENTION

This application is a continuation-in-part of my copending U.S. patent application Ser. No. 145,811, filed May 21, 1971, now U.S. Pat. No. 3,746,122, entitled Multi-directional Seismic Exploration Method, and assigned to the same assignee as this application.

This invention relates to seismic exploration methods for determining the location and course of subsurface earth structures.

A common method of seismic exploration is carried out by locating a string of spaced seismic detectors along a straight line at the surface of the earth. A seismic source is located in line with the detectors and operated to produce a seismic disturbance. Such disturbance produces subsurface reflections which are received by the detectors and recorded for later analysis. The string of detectors is then picked up and relocated either along a second line running parallel to the first line or at a new location in line with the first line and the foregoing process repeated for the second location. This process is continued until the desired area has been surveyed. As is apparent, this process can become rather tedious and time consuming where a relatively large surface area of the earth is to be surveyed.

A known problem which exists in the seismic exploration art is that of distinguishing the desired subsurface earth structure reflection signals from various extraneous seismic vibrations which are also received by the detectors and which are commonly referred to as "noise." A known technique for minimizing such noise is commonly referred to as "stacking." Such stacking technique involves the use of multiple sources for obtaining multiple reflections from a common subsurface point. After appropriate processing, the individual recordings for the common subsurface point are combined to produce a composite record wherein the desired signal components are emphasized and the undesired noise components are minimized. This stacking technique is described in greater detail in U.S. Pat. No. 2,732,906, granted to W. H. Mayne on Jan. 31, 1956, and in U.S. Pat. No. 3,040,833, granted to H. L. Mendenhall and S. D. Elliott on June 26, 1962.

When a seismic exploration is to be conducted in an area covered by navigable water, substantially all of the difficulties and complications of a land survey must be faced and overcome, and in addition, the problems caused by water currents and inaccurate navigation which affect the absolute position of the survey vessels and the hydrophones employed in conjunction with them must be solved. Various procedural steps have been proposed in the past for this purpose including those shown in Backus et al. U.S. Pat. No. 3,506,955.

It is an object of the present invention to provide new and improved methods of seismic exploration for obtaining a greater amount of data concerning subsurface earth structures for a given expenditure of time and labor or conversely, for obtaining a given amount of data for a lesser expenditure of time and labor.

It is another object of the invention to provide new and improved seismic exploration methods for enabling a greater degree of stacking for a given expenditure of time and labor.

It is a further object of the invention to provide new and improved seismic exploration methods for obtaining better data concerning subsurface earth structures.

Another object of the present invention is to provide new and improved seismic exploration methods for use on navigable waters capable of producing better data which is more precisely located.

For a better understanding of the present invention, together with other and further objects and features thereof, reference with the accompanying drawings, the scope of the invention being pointed out in the appended claims.

BRIEF DESCRIPTION OF THE DRAWINGS

Referring to the drawings.

DESCRIPTION OF THE ILLUSTRATED EMBODIMENT

Figure 1:
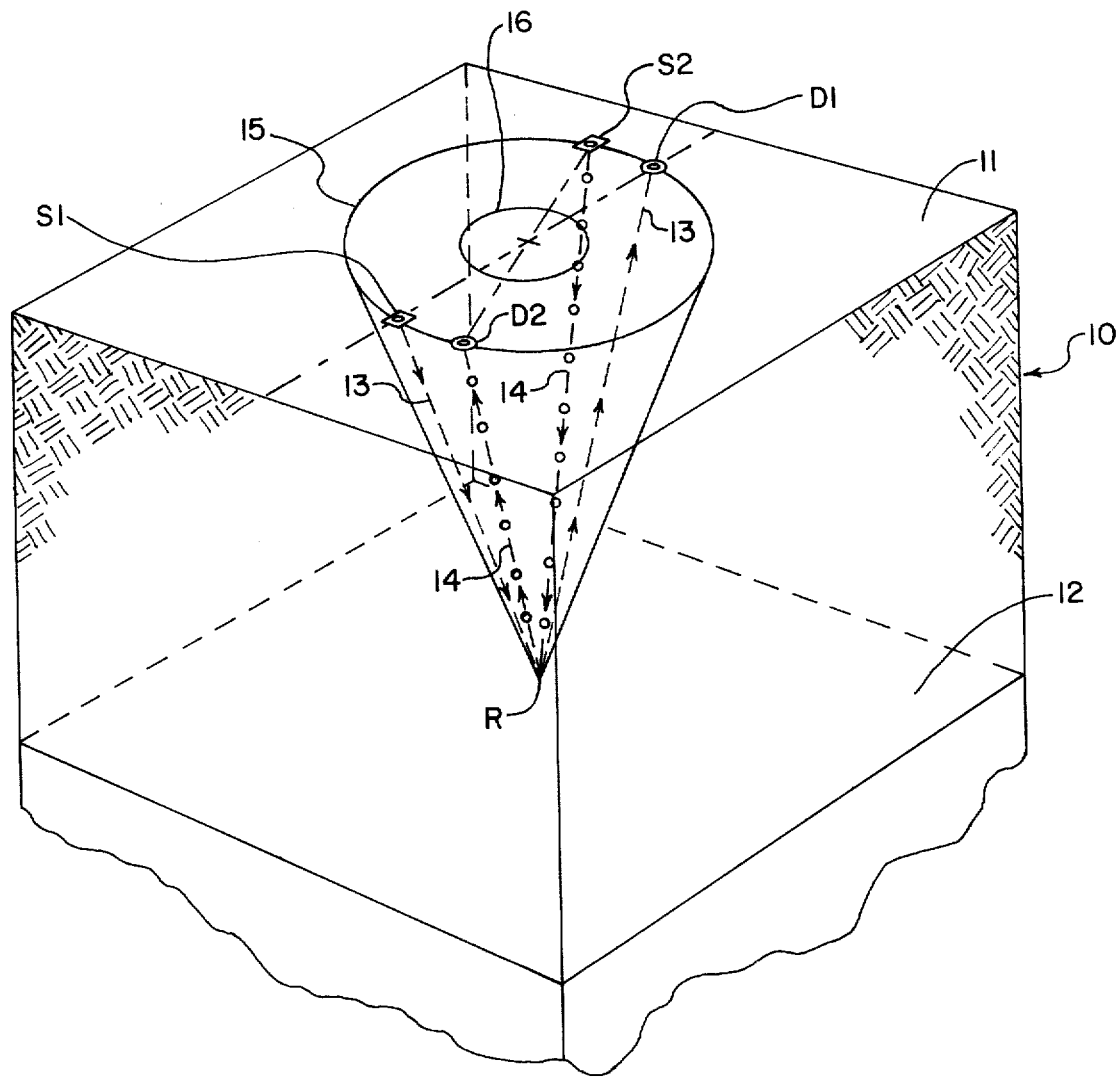
FIG. 1 is a perspective view of a volume of the earth and showing in a simplified manner one of the basic concepts of the present invention.

FIG. 1 shows a three-dimensioinal volume of earth structure 10, the surface of the earth being indicated at 11 and the upper surface of a subsurface earth strata being indicated at 12. In accordance with one embodiment of the invention, seismic sources $S_1$, $S_2$, etc., and seismic detectors $D_1$, $D_2$, etc., are located in a two-dimensional array at the earth's surface 11 for obtaining a multi-directional sampling of each of various subsurface reflection points, one of such points being indicated at R in FIG. 1. Reflection point R is located on the subsurface boundary plane 12. Seismic sources $S_1$, $S_2$, etc., are fired in a sequential manner to produce a time spaced series of seismic disturbances. For the subsurface point R, the seismic disturbance produced by source $S_1$ produces a seismic energy ray path 13 such that the reflection from the point R is received by the seismic detector $D_1$. Similarly, a portion of the energy produced by the seismic disturbance produced by source $S_2$ follows ray path 14 and is received by seismic detector $D_2$. The seismic disturbances received by each of the various detectors $D_1$, $D_2$, etc., are recorded by the usual type of signal recording apparatus (not shown), such apparatus being connected to the various detectors by means appropriate signal conducting cables (not shown).

For each of the source-detector pairs shown in the idealized case of FIG. 1, the angle of incidence of the ray path is equal to the angle of reflection and the subsurface point R is located midway between the particular source and detector being considered. Additional source-detector pairs may be located on the circle 15 to produce additional samplings of the subsurface reflection point R along additional lines running in various additional compass directions. Similarly, further source-detector pairs can be located on opposite sides of additional circles, such as the circle 16, which are concentric with the circle 15. In this manner, there can be developed a solid cone of data regarding the subsurface reflection point R. One practical consequence of this is that during the subsequent analysis the various pieces of data can be examined and only those pieces which give the best results can be selected and used to provide the final analysis. Also, as will be seen shortly, the basic concept of FIG. 1 can be readily extended to obtain multi-directional sampling of a relatively large number of subsurface reflection points during one and the same operation.

When the basic concept of FIG. 1 is expanded in a survey pattern to obtain multi-directional sampling of a large number of reflection points, for example in the manner explained below in connection with FIGS. 2 through 4, a particularly important use which can be made of the data so gathered is the stacking of reflections from common subsurface points for purposes of producing seismic records wherein the effect of seismic noise is minimized. The manner of combining the individual recordings or traces obtained for a given subsurface reflection point is pretty much the same as that employed in connection with the known stacking technique. Briefly, the individual field recordings for the given point are played back and processed in such a manner as to apply the customary elevation, weathering and normal moveout corrections thereto, the corrected traces being individually recorded on a second magnetic tape. The second tape is then played back and the individual corrected signals are combined to produce a single composite signal which is then recorded to provide a composite record wherein the reflections from the common subsurface point augment one another. At the same time, the undesired noise vibrations, which are of a more or less random character for the different directions, more or less cancel one another so as to minimize the net noise component in the final composite record. One form of magnetic recording apparatus suitable in a general sense for accomplishing this stacking process is described in the above-mentioned U.S. Pat. No. 3,040,833 to Mendenhall and Elliott, it being understood that a greater number of initial or input magnetic tape tracks and a somewhat different arrangement of switches would be required in the present case.

All or less than all, of the multi-directional samplings of a given reflecting point may be stacked. Various criteria may be used for including or omitting particular samples from the stacking process as is discussed hereinbelow.

Another important purpose which can be accomplished with a survey employing the principles illustrated in connection with FIG. 1 is that it enables particular ones of the ray paths to be selected and displayed in a coordinated manner to provide improved indications of the subsurface geology. For example, where a fault crosses the area being surveyed, the ray paths which are interrupted by the fault provide poor data concerning the subsurface geology. On the other hand, the ray paths which run more or less parallel to the fault line and are not interrupted by same provide much better data concerning the subsurface geology. Thus, improved analysis can be obtained by selecting the latter type ray paths and reproducing same in a coordinated manner. The multi-directional aspect of the present embodiment makes possible such a selection of only the better data. This is accomplished by initially reproducing the various recorded reflections and studying same to obtain an approximate understanding of the peculiarities of the subsurface geology. Based upon this preliminary study, selected ones of the recorded reflections are thereafter reproduced in a coordinated manner for enabling an improved analysis of the subsurface earth structure.

In addition to selecting particular ray paths to eliminate poor data because of faults, particular ray paths can also be selected for other purposes. For example, particular ray paths may be selected to produce stacked records wherein the effect of changes in normal moveout is reduced. Also, particular ray paths may be selected having lengths of the appropriate values for minimizing undesired noise effects. Also, as a general proposition, the recorded reflections which are to be coordinated can be chosen to concentrate or focus maximum emphasis on places of particular interest.

Figure 2:
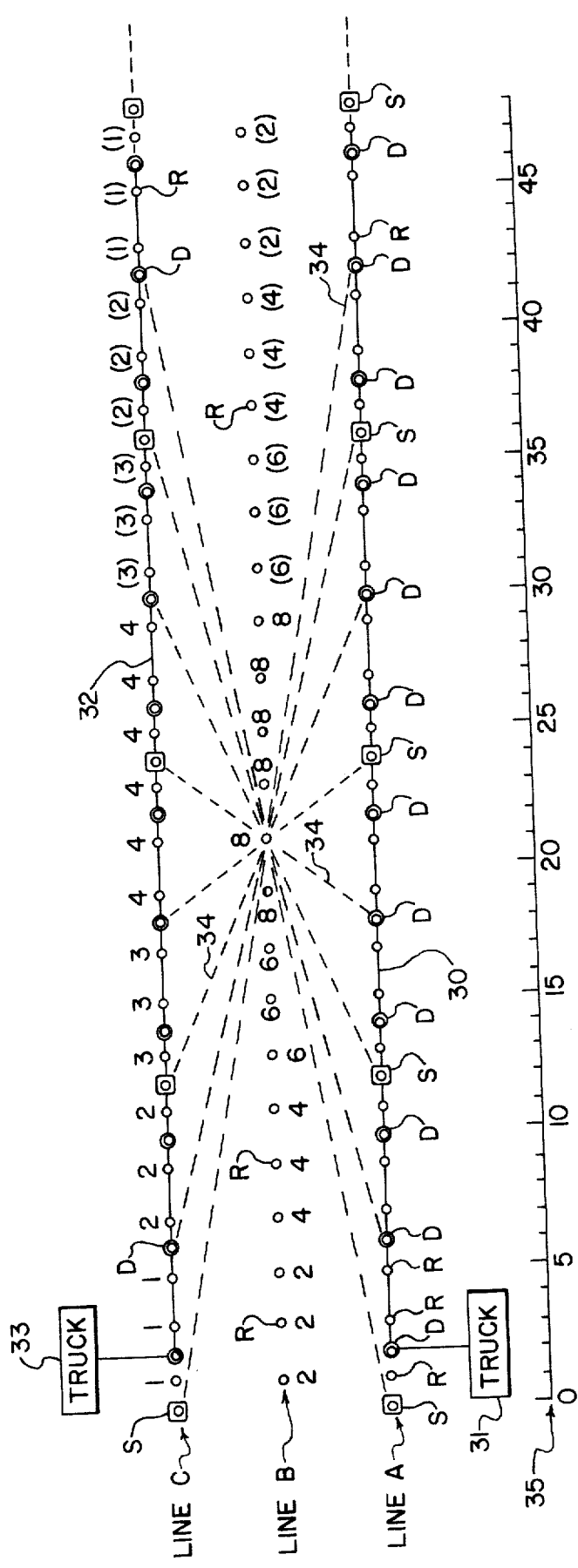
FIG. 2 is a plan view of a seismic source and detector layout in accordance with a linear embodiment of the invention.

Referring to FIG. 2, there is shown a plan view of a seismic source and detector array as laid out on the surface of the earth in accordance with a lineal embodiment of the invention. The array of FIG. 2 includes a first set of spaced seismic detectors D located along a first line A and a second set of spaced seismic detectors D located along a second and different line C. Lines A and C are parallel and are spaced a substantial distance apart. The detectors D on line A are connected to a multi-conductor cable 30 which runs to a recording truck 31, while the detectors D on line C are connected to a multi-conductor cable 32 which runs to a second recording truck 33.

In practicing the method of FIG. 2, seismic disturbances are produced in a sequential manner along line A at spaced source points S located at points different from the locations of the detectors D. In a similar manner, seismic disturbances are also produced in a sequential manner along line C at spaced source points S located at points different from the locations of detectors D. Using the imaginary distance scale 35 running parallel to the detector lines for purposes of explanation, a typical procedure would be to produce a seismic disturbance at the source point (A, 0), where A denotes the detector line and the numeral denotes the distance value on the imaginary scale. The resulting subsurface reflections received by each of the various detectors D in both lines A and C are individually recorded. After this first seismic disturbance subsides, a second seismic disturbance is produced at source point (C, 0) and the subsurface reflections thereof received by all of the seismic detectors D in both lines A and C are again individually recorded. Following this, the three seismic detectors D located at (A, 2), (A, 6) and (A, 10) are picked up and relocated in a spaced in-line manner to the right of the right-hand end of the cable 30. Similarly, the three detectors D located at (C, 2), (C, 6) and (C, 10), together with their interconnecting lengths of cable, are picked up and transferred to the right of the right-hand end of the cable 32. Following this, a seismic disturbance is produced at source point (A, 12) and the resulting subsurface reflections received by all of the various seismic detectors D are recorded. Thereafter, a seismic disturbance is produced at source point (C, 12) and the resulting seismic reflections received by all of the detectors D are again individually recorded. Following this, the three left-hand most detectors in each of lines A and C are picked up and transferred to similar spaced positions to the right of the right-hand ends of cables 30 and 32. Seismic disturbances are then produced at the next pair of source points, the resulting reflection recorded and the next three sets of detectors in each line are picked up and transferred to the right-hand ends of the lines. In this manner, the detector lines are extended in a continuous manner until the desired length of the earth's surface has been surveyed.

The foregoing method represents another application of the multi-directional technique of the present invention. More particularly, there is obtained with this method an additional line of reflection points R lying along a line B located intermediate the detector lines A and C. As is indicated by the ray paths 34 passing through the reflection point R located at (B, 21), each point along line B is sampled in a multi-directional manner. Thus, in effect a solid cone of data is obtained regarding each such reflection point R along line B, (except, of course, for the few extreme left-hand points). Thus, not only does the present method yield a greater number of reflection points but, in addition, there can be obtained for the reflection points R along line B a greater degree of stacking than can be obtained along either of the single lines A and C. In particular, twice as many reflections are obtained for each of the reflection points along line B as are obtained for the corresponding ones of the reflection points along lines A and C.

The small numerals located adjacent the reflection points in lines B and C indicate the number of reflections or folds which can be stacked, it being noted that eight different reflections can be stacked for the reflection point located at (B, 21), such reflections being represented by the different ray paths 34. The small numerals to the right of imaginary scale coordinate 30 are enclosed in parenthesis to show that they indicate the number of reflections obtained for the case where none of the detectors are picked up and moved from the left end to the right end of the array. Where the detectors are in fact picked up and moved in the manner previously described, there is obtained for each of the reflection points along lines A and C to the right of imaginary scale unit 30 a total of four reflection folds and for each of the reflection points along line B to the right of imaginary scale point 30 a total of eight reflection folds, these totals remaining constant so long as the detectors continue to be picked up and transferred from left to right following each pair of seismic disturbances.

In accordance with a further feature of the present invention, the method of FIG. 2 can be employed to provide a stacked shallow refraction survey. This is accomplished by reproducing in a coordinated manner the appropriately selected ones of the recorded refractions. The results of such refraction surveys can be used to further evaluate the reflection survey data.

Figure 3A:
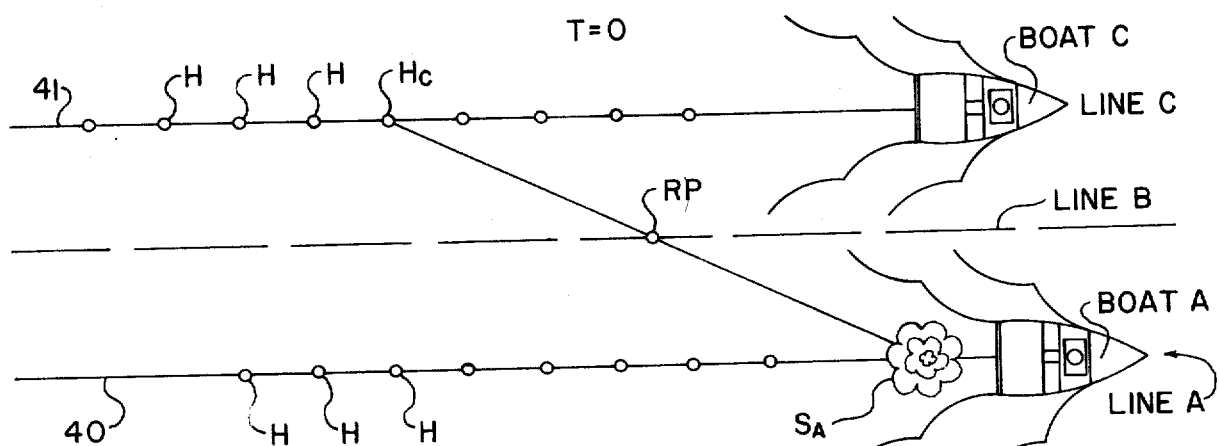
FIGS. 3a and 3b are diagrammatic plan views showing a survey conducted in general accordance with the method of FIG. 2, but conducted on navigable water, the two figures showing successive stages in the operation of the method.
Figure 3B:
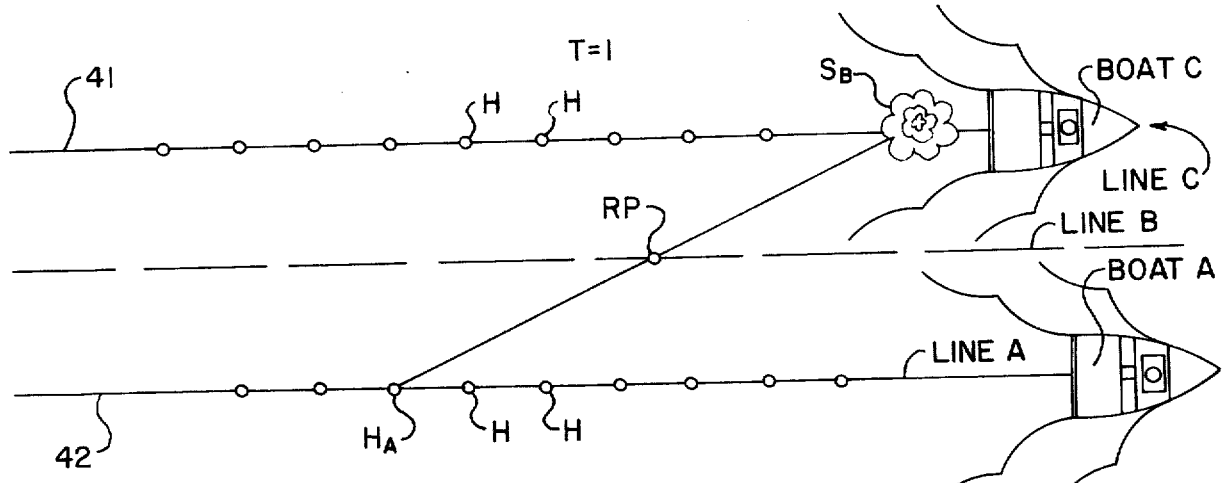

Attention is now directed to FIGS. 3a and 3b which illustrate successive stages in the conduct on navigable water of a survey laid out in accordance with the method of FIG. 2. Thus, the survey laid out includes a boat A proceeding along the survey line A, a boat C proceeding along a survey line C which is parallel to that of line A, and survey line B, which may be regarded as the planned survey line and which, although it contains no sources and detectors, does contain some of the reflecting points being surveyed as explained above in connection with FIG. 2. For the purposes of this discussion it is assumed that lines A, B and C are very long and that the source and detector spacings are the same as those employed in the embodiment of FIG. 2. Thus, in the portions of lines A, B and C appearing in FIGS. 3a and 3b, fourfold sampling of each reflecting point along lines A and C will be effected and eightfold sampling of each reflecting point along line B will be obtained.

From FIGS. 3a and 3b it can be seen that survey boats A and C proceed on generally parallel courses (line A and line C) on either side of and along the planned survey line (line B). Survey boats A and C are aligned generally abreast, although it can be seen from the figures that boat A preferably maintains a position somewhat in advance of boat C, for reasons discussed below. In accordance with the invention, survey boats A and C proceed along their respective courses at substantially equal speeds. Each survey boat tows a string of hydrophones astern. The string for boat A is designated 40 in the figures and that for boat C 41. Hydrophones H are spaced equally along the strings 40 and 41. As FIGS. 3a and 3b are drawn, a somewhat idealized situation is depicted, in that the hydrophone strings 40 and 41 are shown as tracking exactly the planned survey lines A and C.

FIG. 3a is drawn to illustrate a time designated arbitrarily $T=0$, and FIG. 3b is drawn to illustrate a time arbitrarily designated $T=1$, a time interval later than $T=0$ such that survey boats A and C at their selected equal speeds have travelled a distance substantially equal to one hydrophone spacing. In FIG. 3a a seismic disturbance designated $S_A$ is created at $T=0$, a selected distance astern boat A on line A and at a selected distance ahead of the string of hydrophones 41. The hydrophone H designated with a subscript C in string 41 receives a reflection of disturbance at $S_A$ from reflecting point RP, on line B.

In FIG. 3b, a seismic disturbance at $S_B$ is created at $T=1$ astern of boat C and at a selected distance in front of hydrophone string 41, said distance being the same as that by which $S_A$ leads hydrophone string 40 in FIG. 3a. The hydrophone designated $H_A$ in FIG. 3b receives a signal, reflected by RP, on line B, of the seismic disturbance $S_B$. The preferred staggering of boats A and C with one positioned about one hydrophone spacing ahead of the other facilitates the positioning of the disturbances properly with respect to the hydrophones.

The pair of steps illustrated in FIGS. 3a and 3b is repeated at fixed time intervals as survey boats A and C proceed along the planned course or line of the survey.

From the foregoing description, it can be seen that RP on line B, has been sampled twice from different directions or azimuths, and it will be sampled additional times as the survey proceeds farther to the right as FIGS. 3a and 3b are drawn. Thus, in accordance with the invention, there are produced multiple samplings of reflecting point RP which may be stacked or otherwise processed in the manner described above.

Figure 4:
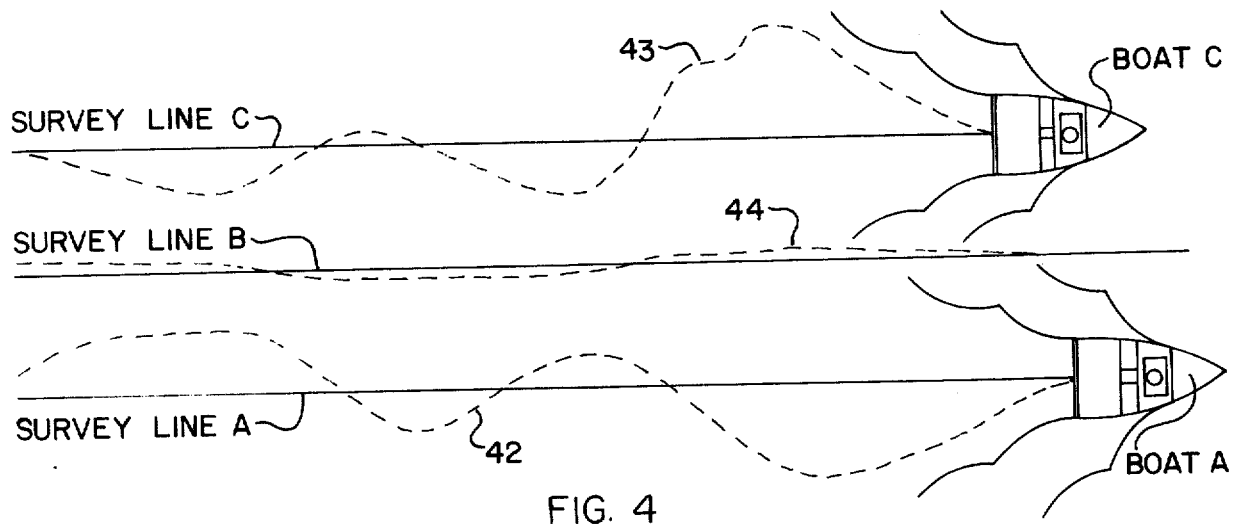
FIG. 4 is a diagrammatic plan view of a survey method performed in accordance with FIGS. 3a and 3b, the figure illustrating the improved positioning of the data obtained in accordance with the invention.

Attention is now directed to FIG. 4 which illustrates very diagrammatically the data location improvement aspects of the present invention. In FIG. 4 there appear survey lines A, B and C which are planned survey lines for a survey conducted generally in accordance with the methods of FIGS. 2, 3a and 3b. Survey boat A is shown traversing line A and survey boat C is shown traversing line C. Survey line B is the line along which maximum stackable data will be gathered, as explained above. A curved dashed line 42 is drawn generally along survey line A, but deviating therefrom. Similarly, a curved dashed line 43 is drawn along, but deviating from, survey line C. For the purposes of illustrating the invention, lines 42 and 43 may be viewed in two alternate ways. Under the first view, they represent plots of the courses of survey boats A and C as they attempted to perfectly traverse survey lines A and C. Their attempts failed because of navigational errors and/or the efffect of water currents. Under the other view, lines 42 and 43 may be taken as representing the instantaneous positions at a given moment of the strings of hydrophones towed behind survey boats A and C. The deviation of the hydrophone strings from the planned survey lines A and C is caused by the erratic effect of water currents in the region being surveyed.

Under both views taken together, FIG. 4 illustrates the basic point that the location of the hydrophones and the location of the seismic disturbances adjacent the survey boats will both be affected by water currents and navigational errors. Nonetheless, in accordance with the invention, the data gathered along planned survey line B will track that line better than the survey boats and/or hydrophones track survey lines A and C. The reflecting points actually sampled from different azimuths will fall on the dotted curve 44 which is at every point halfway between lines 42 and 43, whether they are regarded as boat course plots or instantaneous hydrophone string location lines. As can be seen from FIG. 4 line 44 follows survey line B quite well. In this manner, uncertainty as to the actual location of reflecting points along line B is reduced, and when the data from line B is stacked in accordance with one aspect of the invention, as explained above, a higher degree of confidence can be had in the working assumption that recordings from the very same reflecting point whose location is definitely known are being made.

I claim:

1. A method for conducting a seismic exploration in a region of interest covered by navigable water comprising:

traversing said region of interest with two vessels on generally parallel courses on either side of and along a planned survey line, said vessels being aligned generally abreast and moving at substantially equal speeds, each vessel towing a string of hydrophones having hydrophones spaced uniformly therealong;

alternately creating seismic disturbances in the water adjacent one vessel and the other at times selected with regard to the speed of the vessels and the spacing of said hydrophones to produce said disturbances at intervals spaced, in the direction of said traverse, at distances substantially equal to the spacing of said hydrophones, whereby to generate multiple signals from common reflecting points along a line deviating from the planned survey line less than the deviations of said vessels and of their strings of hydrophones from their planned courses caused by water currents and navigational errors;

recording substantially all reflections received by said hydrophones;

and stacking recordings of multiple signals received from at least one of said common points, the signals for each respective common point being a result of waves transmitted and received along paths in different vertical planes intersecting on a vertical line through said each respective common point.

2. A method for conducting a seismic exploration in a region of interest covered by navigable water comprising:

traversing said region of interest with two vessels on generally parallel courses on either side of and along a planned survey line, said vessels being aligned generally abreast and moving at substantially equal speeds, each vessel towing a string of hydrophones having hydrophones spaced uniformly therealong;

alternately creating seismic disturbances in the water adjacent one vessel and the other at times selected with regard to the speed of the vessels and the spacing of said hydrophones to produce said disturbances at intervals spaced, in the direction of said traverse, at distances selected with regard to the spacing of said hydrophones, whereby to generate multiple signals from common reflecting points along a line deviating from the planned survey line less than the deviations of said vessels and of their strings of hydrophones from their planned courses caused by water currents and navigational errors;

recording substantially all reflections received by said hydrophones;

and stacking recordings of multiple signals received from at least one of said common reflecting points, the signals for each respective common point being a result of waves transmitted and received along paths in different vertical planes intersecting on a vertical line through said each respective common point.

* * * * *